(12) United States Patent
Gu et al.

(10) Patent No.: US 10,846,320 B2
(45) Date of Patent: *Nov. 24, 2020

(54) AUTOMATED NEWS DIGEST

(71) Applicant: Google LLC, Mountain View, CA (US)

(72) Inventors: Pan Gu, Sunnyvale, CA (US);
Mayuresh Saoji, Fremont, CA (US);
Yuqiang Guan, Sunnyvale, CA (US);
Maricia Scott, Mountain View, CA (US); Vikas Sukla, Sunnyvale, CA (US); Anand Devraj Paka, San Francisco, CA (US)

(73) Assignee: Google LLC, Mountain View, CA (US)

( * ) Notice: Subject to any disclaimer, the term of this patent is extended or adjusted under 35 U.S.C. 154(b) by 165 days.

This patent is subject to a terminal disclaimer.

(21) Appl. No.: 16/266,430

(22) Filed: Feb. 4, 2019

(65) Prior Publication Data
US 2019/0171659 A1    Jun. 6, 2019

Related U.S. Application Data

(63) Continuation of application No. 15/070,432, filed on Mar. 15, 2016, now Pat. No. 10,242,096.

(51) Int. Cl.
*G06F 7/00* (2006.01)
*G06F 16/34* (2019.01)

(52) U.S. Cl.
CPC ................. *G06F 16/345* (2019.01)

(58) Field of Classification Search
CPC ............ G06F 16/345; G06F 16/951; G06F 16/24578; G06F 16/29

USPC ............... 707/723, 725, 999.005, 999.007
See application file for complete search history.

(56) References Cited

U.S. PATENT DOCUMENTS

| | | | |
|---|---|---|---|
| 6,853,950 | B1 | 2/2005 | O'Reilly |
| 7,757,170 | B2 | 7/2010 | Billsus et al. |
| 8,849,809 | B1 | 9/2014 | Seshadri |
| 8,886,836 | B2 | 11/2014 | Luu |

(Continued)

OTHER PUBLICATIONS

"All of your favorite publications in one place," News Republic, retrieved on Jan. 8, 2016. Retrieved from the Internet: URL<http://www.news-republic.com/>, 1 page.

(Continued)

*Primary Examiner* — Md I Uddin
(74) *Attorney, Agent, or Firm* — Fish & Richardson P.C.

(57) ABSTRACT

Methods, systems, and apparatus, including computer programs encoded on computer storage media, for automatic generation of news digests. One of the methods includes accessing a database storing news snapshots, each snapshot identifying a predetermined quantity of top news stories for a period of time, each of the top news stories in a particular snapshot for a particular period of time ranked according to an importance score that measures the importance of the news story relative to other news stories for the particular period of time, determining a digest time period, determining, for the digest time period, all of the snapshots with periods of time included in the digest time period, generating, from the top news stories in the determined snapshots, a digest ranking of digest news stories, and providing, to a user device, data identifying one or more of the digest news stories for presentation according to the digest ranking.

7 Claims, 4 Drawing Sheets

(56) References Cited

U.S. PATENT DOCUMENTS

| | | | |
|---|---|---|---|
| 2006/0270392 A1 | 11/2006 | Scott | |
| 2007/0143279 A1 | 6/2007 | Yao | |
| 2008/0066104 A1 | 3/2008 | Murakoshi | |
| 2011/0289088 A1* | 11/2011 | Yarin | G06F 16/70 707/738 |
| 2013/0191462 A1* | 7/2013 | Hartzler | G06Q 50/01 709/206 |
| 2013/0246521 A1 | 9/2013 | Schacht | |
| 2013/0332523 A1 | 12/2013 | Luu | |
| 2014/0188859 A1 | 7/2014 | Curtiss et al. | |

OTHER PUBLICATIONS

"News aggregator," from Wikipedia, the free encyclopedia, last modified on Jan. 7, 2016 [retrieved on Jan. 8, 2016]. Retrieved from the Internet: URL<https://en.wikipedia.org/wiki/News_aggregator>, 6 pages.

"Top Stories," Google News, Jan. 8, 2016, retrieved from the Internet: URL <http://news.google.com/>, 10 pages.

"Virtual Reality," Google Search in the past month, google.com, retrieved on Jan. 19, 2016. Retrieved from the Internet: URL<https://www.google.com/search?hl=en&gl=us&tbm=nws&authuser=0&q=art&oq<art&gs_1=n#hl=en&gl=authser=0&tbm=nws&q=virtual+reality>, 3 pages.

"Virtual Reality," Google Search in the last 24 hours, google.com, retrieved on Jan. 19, 2016. Retrieved from the Internet: URL<https://www.google.com/search?hl=en&gl=us&tbm=authuser=0&q=art&oq=art&gs_1=n#hl=en&gl=us&authuser=0&tbm=nws&q=virtual+reality>, 3 pages.

Luckerson, "Here's How Facebook's News Feed Actually Works," TIME, Jul. 9, 2015 [retrieved on Jan. 19, 2016]. Retrieved from the Internet: URL<http://time.com/3950525/facebook-news-feed-algorithm/>, 6 pages.

The Economist, "The Economist Espresso, Our new daily edition for smartphones," economist.com blog, Nov. 6, 2014 [retrieved on Jan. 8, 2016]. Retrieved from the Internet: URL<http://www.economist.com/blogs/newsbook/2014/11/economist-espresso>, 7 pages.

Yahoo, "Yahoo News Digest," Apple App Store, retrieved on Jan. 19, 2016, 3 pages.

* cited by examiner

AUTOMATED NEWS DIGEST

CROSS-REFERENCE TO RELATED APPLICATIONS

This application is a continuation application of, and claims priority to, U.S. patent application Ser. No. 15/070,432, titled "AUTOMATED NEWS DIGEST," filed on Mar. 15, 2016. The disclosure of the foregoing application is incorporated herein by reference in its entirety for all purposes.

BACKGROUND

News content providers provide news articles for a current time, e.g., what are the headlines right now. News content providers provide a list of a subset of news articles or news stories that are deemed the most important for the current time, e.g., to allow a user to view the most shared news articles or news stories.

SUMMARY

In general, one innovative aspect of the subject matter described in this specification can be embodied in methods that include the actions of accessing a database storing news snapshots, each snapshot identifying a predetermined quantity of top news stories for a period of time, wherein the period of time for each snapshot is different from the period of time for each of the other snapshots, each of the top news stories in a particular snapshot for a particular period of time ranked according to an importance score that measures the importance of the news story relative to other news stories for the particular period of time, each of the periods of time having a predetermined length, determining a digest time period that includes at least two or more of the periods of time, determining, for the digest time period by accessing the database, all of the two or more snapshots with periods of time included in the digest time period, generating, from the top news stories in the determined snapshots, a digest ranking of digest news stories for the digest time period, and providing, to a user device, data identifying one or more of the digest news stories for presentation according to the digest ranking. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. Generating, from the top news stories in the determined snapshots, the digest ranking of the digest news stories for the digest time period may include determining first top news stories included in the determined snapshots, selecting, using the importance scores for the determined first top news stories, second top news stories for the digest time period from the determined first top news stories, and ranking the second top news stories using the importance scores for each of the second top news stories. Selecting the second top news stories for the digest time period from the determined first top news stories may include determining, for each of the determined first top news stories, a maximum importance score for the determined first top news story using the importance scores for the determined top news story from each of the determined snapshots, and selecting, as the second top news stories, the determined first top news stories that each have a maximum importance score greater than each of the maximum importance scores for the other determined first top news stories not including the other second top news stories. Selecting the second top news stories for the digest time period from the determined first top news stories may include determining, for each of the determined first top news stories, an average importance score for the determined first top news story using the importance scores for the determined top news story from each of the determined snapshots, and selecting, as the second top news stories, the determined first top news stories that each have an average importance score greater than each of the average importance scores for the other determined first top news stories not including the other second top news stories.

In some implementations, selecting the second top news stories for the digest time period from the determined first top news stories may include determining, for each of the determined first top news stories, a median importance score for the determined first top news story using the importance scores for the determined top news story from each of the determined snapshots, and selecting, as the second top news stories, the determined first top news stories that each have a median importance score greater than each of the median importance scores for the other determined first top news stories not including the other second top news stories. Selecting the second top news stories for the digest time period from the determined first top news stories may include determining, for each of the determined first top news stories, an importance score rate of change for the determined first top news story using the importance scores for the determined top news story from each of the determined snapshots, and selecting, as the second top news stories, the determined first top news stories that each have an importance score rate of change greater than each of the importance score rates of change for the other determined first top news stories not including the other second top news stories. Selecting the second top news stories for the digest time period from the determined first top news stories may include determining, for each of the determined first top news stories, a quantity of occurrences the first top news story appears in the determined snapshots, and selecting, as the second top news stories, the determined first top news stories that each have a quantity of occurrences the determined top news story appears in the determined snapshots greater than each of the quantity of occurrences for the other determined first top news stories not including the other second top news stories.

In some implementations, selecting the second top news stories for the digest time period from the determined first top news stories may include determining, for each of the determined first top news stories, a number of articles associated with the determined first top news story, and selecting, as the second top news stories, the determined first top news stories that each have a number of articles associated with the determined first top news story greater than each of the numbers of articles for the other determined first top news stories not including the other second top news stories. Selecting the second top news stories for the digest time period from the determined first top news stories may include determining a user profile for the user device, ranking, using the user profile, the determined first top news stories, and selecting, as the second top news stories, a predetermined quantity of the top ranked determined first top new stories. Selecting the second top news stories for the digest time period from the determined first top news stories may include determining a user profile for the user device, determining one or more categories of interest identified in the user profile, selecting the determined first top news stories that belong to the determined categories, ranking the selected first top news stories, and selecting, as the second top news stories, a predetermined quantity of the top ranked selected first top new stories.

In some implementations, determining the digest time period that includes at least two or more of the periods of time may include receiving, from a user device, a request for a news digest for the digest time period. The method may include determining a first profile for the user device, determining a first language and a first region for the user device using the first profile, wherein determining all of the snapshots with periods of time included in the digest time period comprises determining, by accessing the database, all of the snapshots with periods of time included in the digest time period that are associated with the first language and the first region, receiving, from a second user device, a request for a news digest for the digest time period, determining a second profile for the second user device, determining a second language and a second region for the user device using the second profile, at least one of the second language being a different language than the first language or the second region being a different region than the first region, determining, by accessing the database, second snapshots that include all of the snapshots with periods of time included in the digest time period that are associated with the second language and the second region, generating, from the top news stories in the second snapshots, a second digest ranking of second digest news stories for the digest time period, and providing, to the second user device, data identifying one or more of the second digest news stories for presentation according to the second digest ranking.

In some implementations, the digest time period may be a particular week. Each of the particular periods of time may be non-overlapping. A quantity of the top news stories included in each of the snapshots and a quantity of the top news stories included in the portion of the digest ranking provided to the user device may be the same quantity. The method may include for each of multiple periods of time: determining a plurality of news stories published during the period of time, determining, for each of the news stories, an importance score for the news story, determining the top news stories from the news stories, the top news stories ranked higher than the other news stories in the plurality of news stories not included the top news stories according to corresponding importance scores, and storing, in the database, a snapshot that identifies each of the top news stories and the corresponding importance scores. For each snapshot, the top news stories in a particular snapshot for a particular period of time may be ranked higher than the news stories for the particular period of time that are not included in the particular snapshot.

The subject matter described in this specification can be implemented in particular embodiments and may result in one or more of the following advantages. In some implementations, a news digest system may provide a user with more unbiased news, may require little or no editorial judgement, or both, compared to systems that have editorial review of news stories. In some implementations, a news digest system may provide news digests irrespective of the digest time period, the region for the news digest, the language for the news digest, or a combination of two or more of these, e.g., the new digest system may provide news digests for any time period, any region, or any language or any combination of these. For instance, the use of a news digest system may allow the news digest system to provide a news digest to a user device irrespective of user requirements for the news digest, e.g., for any language, region, or time period a user may request. In some implementations, a news digest system may personalize a news digest according to user settings, e.g., personal interests of a user. In some implementations, a news digest system may provide a news digest to a user device for a time period during which a user was unable to check the news, e.g., the user did not have Internet access, may provide a news digest to a user device for a particular period of time when a current period of time does not include very important news stories, e.g., and the particular period of time includes more important news stories, may provide a news digest to a user device that includes top stories for a historical time period, e.g., ten years ago, may provide a news digest to a user device that includes top stories for a particular topic of interest, e.g., when the particular topic of interest does not have frequent news stories, or a combination of two or more of these.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Overview

Figure 1:
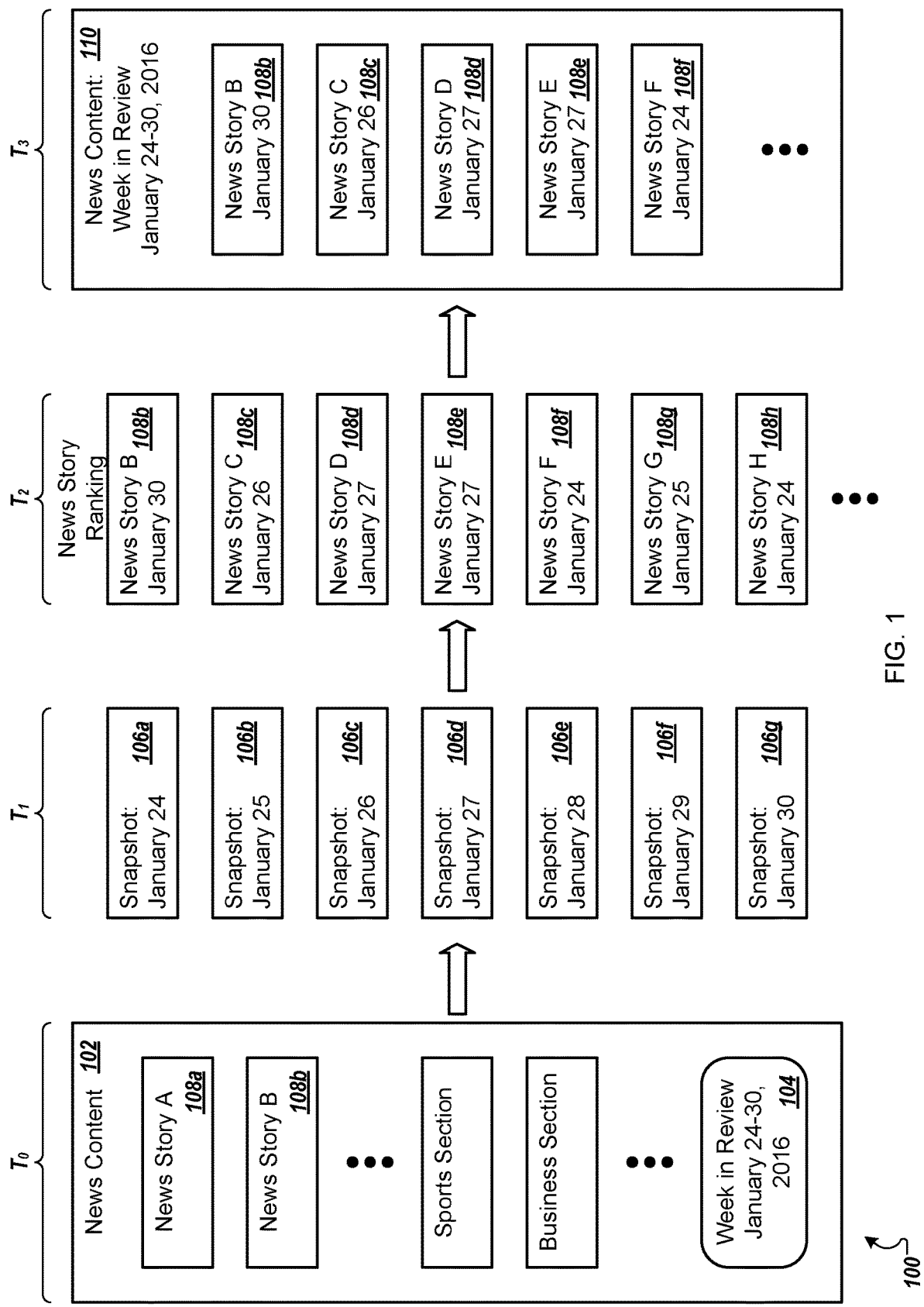
FIG. 1 is an example of an environment in which a news digest system generates a news digest for a digest time period.

FIG. 1 is an example of an environment 100 in which a news digest system generates a news digest for a digest time period. For instance, the news digest system may receive a request, from a user device, for a news digest at time $T_0$. The user device may present a news content user interface 102 to a user that includes links to various news stories or articles, various news sections, and a "week in review" option 104. The news content user interface 102 may include any appropriate news content. Upon receipt of an indication of selection of the week in review option 104, the user device sends the request for the news digest to the news digest system.

During time period $T_1$, the news digest system identifies snapshots 106a-g that are included in the digest time period, e.g., each snapshot includes a period of time that falls within the digest time period. Each of the news snapshots 106a-g identifies top news stories for the corresponding time period, e.g., including some of news stories 108a-h. The news digest system may use any appropriate method to determine the news snapshots 106a-g.

In some examples, the request for the news digest may identify the digest time period, e.g., Jan. 24-30, 2016. The news digest system determines the snapshots 106a-g, stored in a database of the news digest system, for the digest time period. For instance, when the database includes a snapshot for each day, the news digest system determines seven snapshots.

The news digest system, during time period $T_2$, ranks each of the news stories 108a-h from the snapshots 106a-g. For instance, the news digest system determines a score for each of the news stories 108a-h that represents the news story's importance. The news digest system may use an importance score of each of the news stories 108a-h to determine the score. The importance score for a particular news story may be included in the same snapshot that identifies the particular news story. In some examples, the news digest system may use a number of articles written about a news story, e.g., when each news story relates to a general event such as snow in Washington, D.C. and the separate articles were published by different news distributors; a cumulative number of clicks on articles about a news story; a cumulative number of social actions, e.g., shares, likes, etc.; a cumulative number of queries received from user devices for which articles for a news story are responsive, are selected, or both; a rate of change of a metric for a news story, e.g., when the metric may be clicks, queries, social actions; a time, recency or freshness of publication related to a news story; an expertise of a publisher in a certain news topic or geographic area, e.g., when the publisher published an article related to the news story; a historical click rate on articles from the publisher; citations made to the article and/or publisher; relevance of article to the news story; or another appropriate metric; or a combination of two or more of these to determine the score for the news story. The news digest system may use any number of relevant signals to determine a score and corresponding ranking of the news stories 108a-h.

The news digest system uses the scores to rank the news stories 108a-h. For instance, the news digest system may determine that a news story A 108a for the digest time period, e.g., Jan. 30, 2016, has a lower score than the news stories B through H 108b-h as indicated by the news story A 108a not being presented in the news story ranking shown in FIG. 1.

The news digest system, at time $T_3$, provides identifiers for some of the news stories 108a-h to a user device for presentation. For instance, the news digest system provides links for the news stories B through F 108b-f to the user device to cause the user device to present the links in a week in review user interface 110. The links for each of the news stories may include a single link to a news article that describes the news story or multiple links, each of which is for a single news article for the news story. In some examples, the news digest system may provide, to the user device for presentation with the links, text for each of the news stories that describes a summary, news article titles, or other information associated with the news stories.

Example News Digest System

Figure 2:
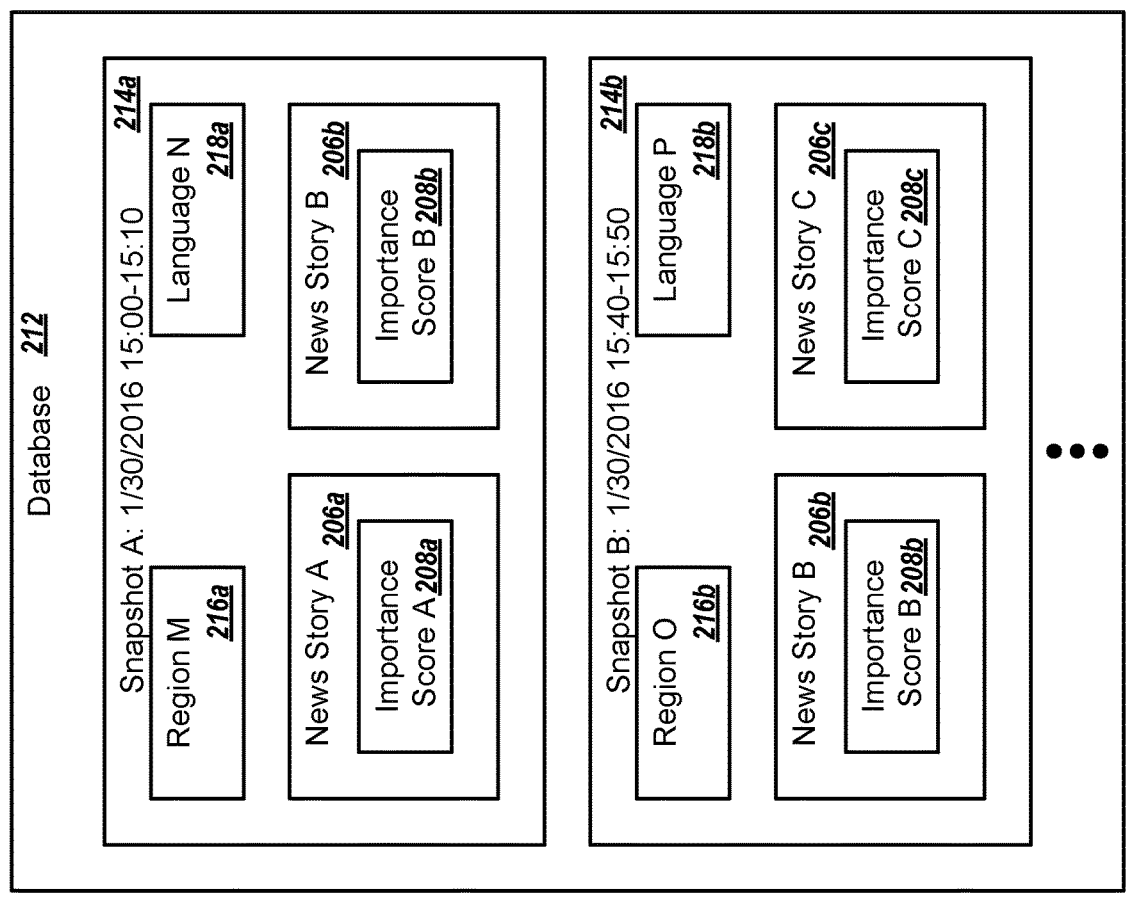
FIG. 2 is an example of a news digest system that generates news digests for presentation on a user device.
Figure 2:
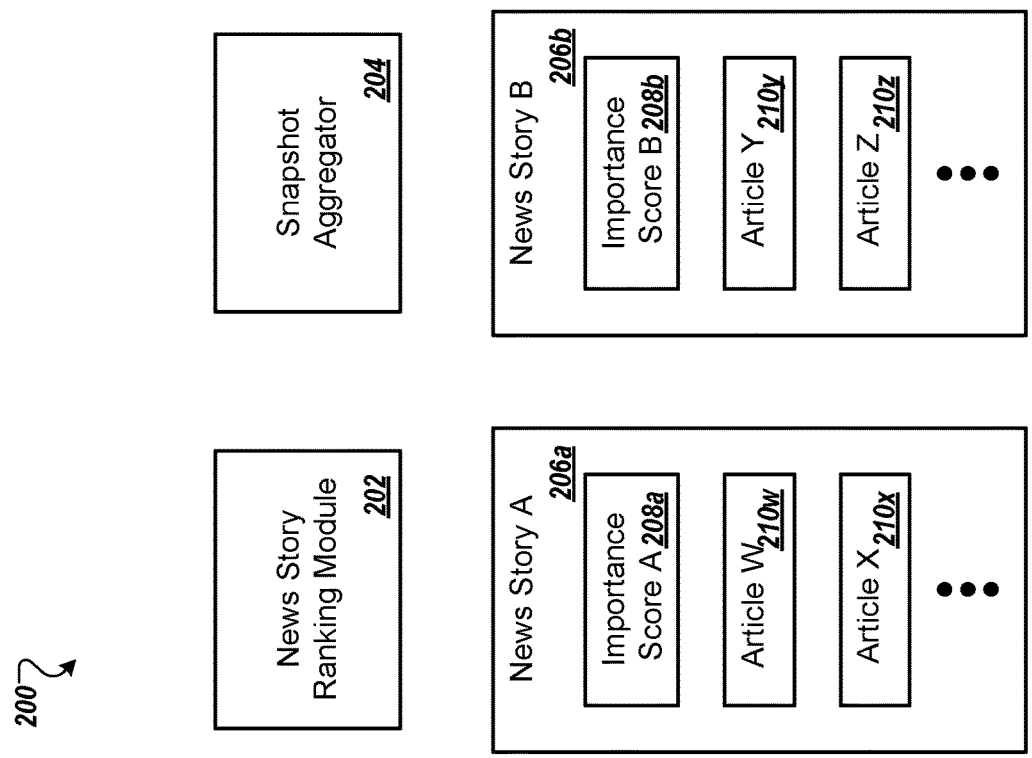

FIG. 2 is an example of a news digest system 200 that generates news digests for presentation on a user device. For example, the news digest system 200 may generate a news digest that includes ten news stories and provide instructions to a user device to cause the user device to present information about the ten news stories in a user interface on a display.

The news digest system 200 includes a news story ranking module 202 that ranks the news stories A-B 206a-b according to importance scores. For instance, the importance scores 208a-b represent an importance of the corresponding news story compared to the other news stories, e.g., a higher importance score is assigned to a news story in which more people are interested compared to another news story with a lower importance score.

The news story ranking module 202 may generate importance scores A-B 208a-b for the news stories A-B 206a-b. The news story ranking module 202 may use any number of signals or combinations of signals to determine a ranking such as a number of articles written about a news story, a cumulative number of clicks on articles about a news story, a cumulative number of social actions, a cumulative number of queries received from user devices to which articles for a news story are responsive, are selected, or both, a rate of change of a metric for a news story, or a combination of two or more of these to determine an importance score for the news story. The news story ranking module 202 may use any appropriate method to determine the importance scores for the news stories A-B 206a-b.

For instance, the news story ranking module 202 may select a particular news story, e.g., the news story A 206a, and determine the articles that describe the particular news story, e.g., the articles W-X 210w-x. The news story ranking module 202 or another system may generate a list of news stories for ranking, e.g., using articles published online that describe the particular news story. The news story ranking module 202 uses information about the particular news story to determine an importance score, e.g., the importance score A 208a, for the particular news story.

In some implementations, the news story ranking module 202 may receive indication of the news stories A-B 206a-b and the corresponding importance scores A-B 208a-b from another system, e.g., a news story scoring system. The other system may be a system that provides identification of news articles to user devices for presentation. The other system may be part of the news digest system 200 or a separate system.

The news story ranking module 202 ranks the news stories for a period of time and periodically records all of the top news stories for a given moment and their corresponding importance scores. For instance, the news story ranking module 202 uses the ranked news stories for a period of time to generate a snapshot for the period of time. The news story ranking module 202 determines that for Jan. 30, 2016, from 15:00 to 15:10, the news stories A-B 206a-b had the highest importance scores and stores data representing a snapshot A 214a in a database 212, e.g., stores a record in the database 212. In some examples, a snapshot generator receives the ranked news stories from the news story ranking module 202 and generates the snapshots 214a-b.

In some implementations, each snapshot in the database 212 includes data representing a region 216a-b, a language 218a-b, or both. For example, the news story ranking module 202 may determine that the news stories A-B 206a-b for the snapshot A 214a are specific to a region M 216a and a language N 218a, such as North America or the United States, and English. The news story ranking module 202 determines another snapshot for a different region, such as the United Kingdom, or another language, such as French or Spanish.

The news story ranking module 202 may generate a snapshot B 214b for Jan. 30, 2016 from 15:40-15:50. The snapshot B 214b may identify the news story B 206b and a news story C 206c. The snapshot B 214b may be for the same region and language as the snapshot A 214a, but a different time period, or for a different region and language combination. Here, both snapshots identify the news story B 206b. For instance, this news story B 206b may be popular in both North America and the United Kingdom, and be a news story in English when the language N 218a and the language P 218b are the same and the regions M and O 216a-b are different.

In some examples, the news story may include articles in both English and Spanish and both snapshots A-B 214a-b may be for the same region, but different languages. In this example, the news story B 206b in the snapshot A 214a may be for an English version of the news story, determined by the language N 218a and the news story B 206b in the snapshot B 214b may be for a Spanish version of the news story, determined by the language P 218b.

The news story ranking module 202 generates snapshots for every ten minute time period. The news story ranking module 202 may use any appropriate period of time, such as an hour, thirty minutes, or a minute. The news story ranking module 202 may select the length of the time period to balance an amount of top news stories stored in the database 212 with memory storage requirements for the database 212. In some implementations, the news story ranking module 202 may dynamic select a frequency for creating a snapshot or change a frequency at which snapshots are created. For example, the news story ranking module 202 may use longer snapshot duration for time periods during which few news stories are generated, e.g., during the night for a particular region, during the weekend for the particular region, or both. The news story ranking module 202 may use shorter snapshot duration for time periods during which a larger quantity of news stories are generated, e.g., during business hours of a weekday for a particular region. The news story ranking module 202 may use historical data to determine the frequency with which news stories are created for a particular time period. The news story ranking module 202 may dynamically determine the frequency with which news stories are created for a time period and adjust the frequency with which snapshots are created using the frequency with which news stories are created.

For example, when the news story ranking module 202 determines that the N most recent snapshots indicate a high average number of news stories have been created in each of the N most recent snapshots, e.g., compared to a previous average number of news stories per snapshot, then the news story ranking module 202 increase the frequency snapshots with which snapshots are generated and decreases the length of the time period of snapshots that the news story ranking module 202 will create. When the news story ranking module 202 determines that the N most recent snapshots indicate a lower average number of news stories have been created in each of the N most recent snapshots, e.g., compared to a previous average number of news stories per snapshot, then the news story ranking module 202 decreases the frequency snapshots with which snapshots are generated and increases the length of the time period of snapshots that the news story ranking module 202 will create.

A snapshot aggregator 204, included in the news digest system 200, receives identification of a particular period of time, e.g., a digest time period, and generates a news digest for the particular period of time. For instance, the snapshot aggregator 204 may receive a request for a news digest from a user device. In some examples, the snapshot aggregator 204 may generate a news digest for the particular period of time prior to receipt of a request for the news digest, e.g., and store the news digest in a memory. The snapshot aggregator 204 may generate news digests according to a schedule.

The snapshot aggregator 204 determines the snapshots in the database 212 for the particular period of time and aggregates the snapshots, and the news stories included in the snapshots, by applying a function to the importance scores for the news stories included in the snapshots. For instance, the snapshot aggregator 204 may determine which of the news stories are identified in more than one snapshot for the particular period of time. For the news stories that are identified in only one snapshot, the snapshot aggregator 204 may use the corresponding importance scores for the news stories. For the news stories that are identified in more than one snapshot for the particular period of time, the snapshot aggregator 204 may determine the maximum importance score, the average importance scores, weighted average importance scores, median importance scores, an importance score rate of change, or a combination of two or more of these, and use the determined values as the scores for the corresponding news stories.

The snapshot aggregator 204 may select a predetermined number of news stories, e.g., ten news stories, from the snapshots for the particular period of time and that have the highest importance scores and include those stories in a news digest for the particular period of time. For instance, the snapshot aggregator 204 may select a predetermined number of news stories that have the median importance scores for the predetermined period of time. The snapshot aggregator 204 may select a predetermined number of news stories that have the average importance scores for the predetermined period of time. The snapshot aggregator 204 may select a predetermined number of news stories that have the weighted average importance scores, e.g., when the weight is selected using another metric such as number of articles for the news story, for the predetermined period of time.

In some examples, the snapshot aggregator 204 may determine a rate of change of an importance score for a news story across the snapshots for the predetermined period of time, e.g., a value by which the importance score increases, decreases, or remains the same, and use the rate of change to select the news stories for the news digest. For instance, the snapshot aggregator 204 may select the ten news stories that have the greatest rate by which the corresponding importance scores increase over the predetermined period of time as the news stories for the news digest. The rate of change may be an average rate of change, a rate of change at a particular instance in the particular period of time, e.g., the middle of the particular period of time or the end of the particular period of time, or another rate of importance change.

The snapshot aggregator 204 ranks the predetermined number of news stories, e.g., according to their importance scores, for presentation in the news digest. The predetermined number of news stories may be the same as the number of news stories identified by each of the snapshots. The snapshot aggregator 204 may provide the news digest to a user device, e.g., may provide instructions to the user device for presentation of the news digest. In some examples, the snapshot aggregator 204 stores data representing the news digest, e.g., identifiers for each of the predetermined number of news stories, in a memory for later presentation of the news digest on a user device.

Example News Digest Process

Figure 3:
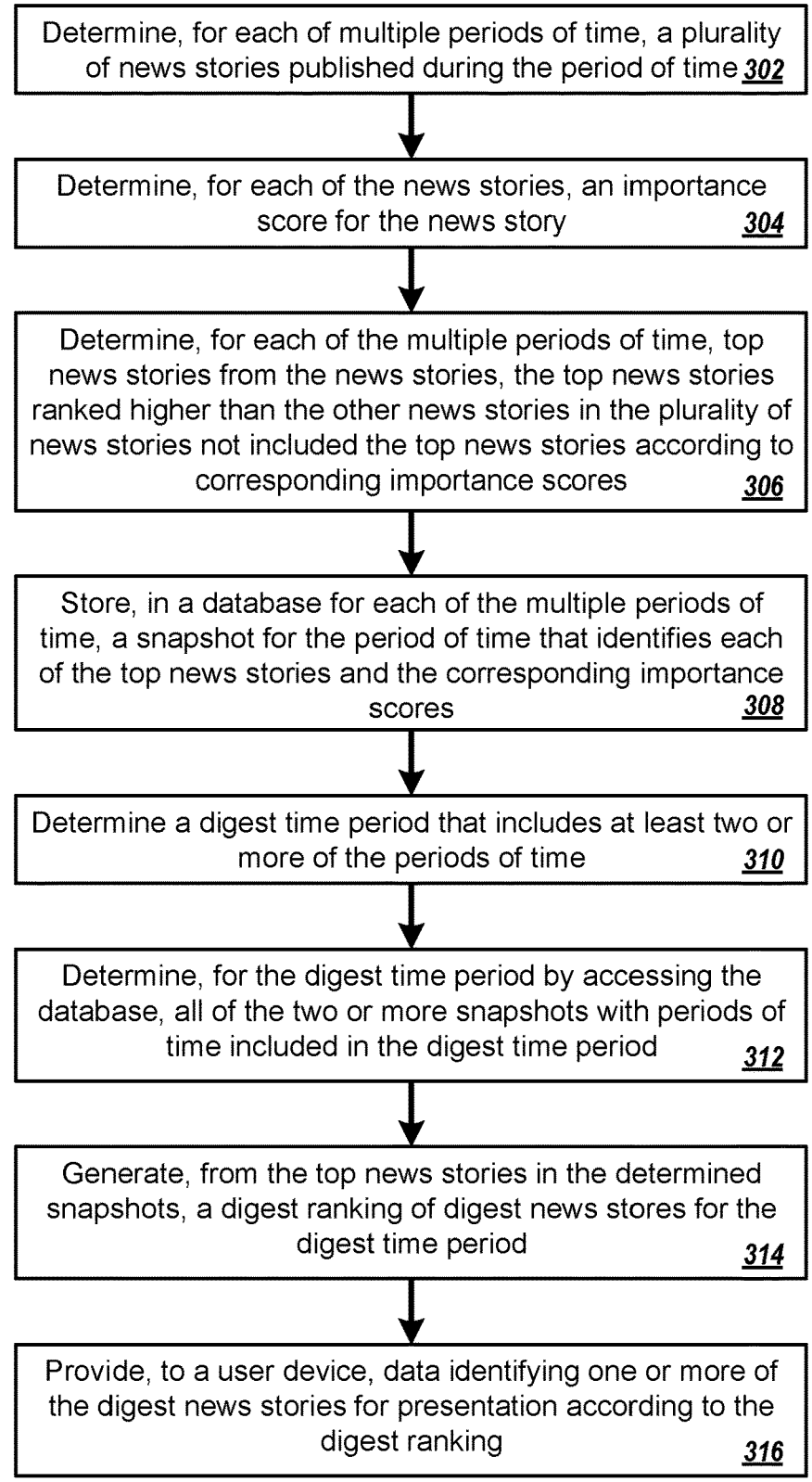
FIG. 3 is a flow diagram of a process for providing data identifying digest news stories to a user device.

FIG. 3 is a flow diagram of a process 300 for providing data identifying digest news stories to a user device. For example, the process 300 can be used by the news digest system 200 shown in FIG. 2.

A news digest system determines, for each of multiple periods of time, a plurality of news stories published during the period of time (302). The news digest system may determine, for a particular period of time, all of the news stories published during that period of time. The news digest system may use headlines or titles of published articles, e.g., articles published online, and cluster key words from the headlines, titles, or both, to determine the news stories. The news digest system may use a publication date or a publication date and time to determine when an article was published and the corresponding period of time.

The news digest system determines, for each of the news stories, an importance score for the news story (304). The news digest system may generate the importance scores for the news stories, e.g., as described in more detail above. For instance, the news digest system may use information about the articles that describe a particular news story to determine the importance score for the particular news story.

The importance score for the news story is specific to the corresponding period of time. For instance, articles for a particular news story may be published during a first period of time and the particular news story may have multiple importance scores, a first importance score for the first period of time and a second importance score for a second period of time during which some of the articles for the particular news story were viewed but no new articles were published. In some examples, articles for the particular news story may be published during multiple different periods of time and the news digest system may determine importance scores for each period of time during which an article for the particular news story was viewed, potentially including the periods of time in which the articles were published.

The news digest system determines, for each of the multiple periods of time, top news stories from the news stories, the top news stories ranked higher than the other news stories in the plurality of news stories not included the top news stories according to corresponding importance scores (306). For instance, the news digest system creates multiple snapshots, each for a corresponding period of time and that each identify top news stories for the corresponding period of time. The top news stories for a particular period of time may be the most popular news stories, most widely read news stories, or both, e.g., as determined by the corresponding importance scores.

Each of the snapshots may identify the same number of top news stories, e.g., ten news stories. In some examples, the news digest system may dynamically determine a number of news stories to include in a snapshot. For instance, the news digest system may use a total number of news stories or a combination of the importance scores to determine how many news stories to identify in a corresponding snapshot. When the news digest system determines that there is a higher quantity of news stories for a first period of time the news digest system may identify more news stories in a first snapshot for the first period of time compared to a second period of time in which fewer news stories were identified, and for which a corresponding second snapshot identifies fewer news stories. When the news digest system determines that a sum of first news stories' importance scores for a first period of time is greater than a sum of second news stories' importance scores for a second period of time, the news digest system may include more top news stories in a first snapshot for the first period of time than the number of top news stories in a second snapshot for the second period of time.

The news digest system stores, in a database for each of the multiple periods of time, a snapshot for the period of time that identifies each of the top news stories and the corresponding importance scores (308). For instance, the news digest system may make a record in the database for each snapshot that identifies the news stories for the snapshot and the corresponding importance scores. In some examples, the record may indicate a language, a region, or both, for the snapshot, e.g., when different news stories are popular in different languages or different locations in the world.

Each of the snapshots may identify a predetermined quantity of top news stories for the corresponding period of time. The length of the periods of time may be the same. For instance, each snapshot may be for a ten minute period of time or an hour. In some examples, some of the snapshots may have different time period lengths.

Each period of time for the snapshots is for a different period of time than the other snapshots. For instance, none of the periods of time with the same language and region combination have the same start and end time.

When the news digest system includes different snapshots for different languages, regions, or both, the news digest system may include multiple snapshots for the same period of time. In these examples, the news digest system has one and only one snapshot for each language, each region, and/or each language and region combination.

In some examples, another system creates the snapshots, e.g., using steps 302 through 306, and provides the snapshots to the news digest system. For instance, a snapshot system creates the snapshots and provides the snapshots to the news digest system. The news digest system stores the received snapshots in a database.

The news digest system determines a digest time period that includes at least two or more of the periods of time (310). The news digest system may receive a request for a news digest. The request may indicate the start time and end time for the digest time period. For instance, the digest time period may include a beginning and an ending date. When the digest time period includes only dates, and not times, the news digest system may determine that the beginning time is at midnight, e.g., the beginning of the day, and that the ending time is at 11:59 PM, e.g., the end of the day. For example, for a digest time period from Jan. 24-30, 2016, the news digest system may select the snapshots include in the time period from Jan. 24, 2016 at 12 AM to Jan. 30, 2016 at 11:59 PM.

In some implementations, a digest time period may be predetermined. For example, the news digest system may generate a weekly digest automatically for a previous week. When the news digest system receives a request for a "week in review" news digest, e.g., that does not specify a digest time period, the news digest system may determine the most recent "week in review" news digest and provide the most recent "week in review" news digest to the requesting device.

The digest time period may be have any appropriate duration. For instance, a digest time period may have a duration of an hour, a day, a week, a month, a quarter, a year, or a decade.

The news digest system determines, for the digest time period by accessing the database, all of the two or more snapshots with periods of time included in the digest time period (312). For example, the news digest system determines a start time and an end time for the digest time period and the snapshots with times that fall between the start time and the end time, inclusive.

The news digest system generates, from the top news stories in the determined snapshots, a digest ranking of digest news stores for the digest time period (314). For instance, the news digest system determines the news stories included in the snapshots for the digest time period. The news digest system determines the importance scores for the determined news stories. The news digest system uses the importance scores to determine the top news stories for the digest time period. The new digest system determines a digest ranking of the top news stories for the digest time period.

In some examples, the news digest system may use other information about the determined news stories to determine the digest ranking. For instance, the database, or another system, may include article click rates, article view rates, social media information about articles, or other importance metric information, e.g., as discussed in more detail above.

The news digest system provides, to a user device, data identifying one or more of the digest news stories for presentation according to the digest ranking (316). For example, the news digest system provides instructions, to the user device, that cause the user device to generate a user interface that depicts the digest ranking. The user interface may include an identifier for each of the digest news stories, e.g., a title, one or more links for each of the digest news stories, e.g., for corresponding news articles, or both.

In some implementations, the process 300 can include additional steps, fewer steps, or some of the steps can be divided into multiple steps. For example, the news digest system may perform steps 310 through 316 and not perform steps 302 through 308. In some examples, a news digest system may receive snapshots, e.g., perform step 308, and use the snapshots to generate a digest ranking, e.g., perform steps 310 through 312.

Optional Implementation Details

In some implementations, a database includes a snapshot for each ten minute interval. For example, the database may include a first snapshot for January 24 from 12 AM to 12:10 AM, a second snapshot for January 24 from 12:10 AM to 12:20 AM, and so on for a total of one-hundred forty-four snapshots for a day. The database may use any appropriate time duration for a snapshot. In some examples, the snapshots are non-overlapping. In some examples, the snapshots are overlapping.

In some examples, a snapshot aggregator may aggregate one or more news digests to determine a final news digest for a predetermined period of time. For instance, the snapshot aggregator may determine first news digests using snapshots from a database, with each of the first news digests being for a corresponding first time period and each of the first time periods having the same duration. The snapshot aggregator determines a second news digest using the first news digest with the second news digest being for a second time period which is longer than the first time periods and includes all of the first time periods. The snapshot aggregator may repeat the process until determining a final news digest for a final digest time period.

For instance, the snapshot aggregator may determine a first news digest and first top news stories for the first news digest using the maximum importance scores for the news stories identified in the snapshots for a corresponding first news digest time period. The snapshot aggregator may determine a second news digest and second top news stories for the second news digest using the maximum importance scores for the news stories identified in the snapshots for a corresponding second news digest time period. The snapshot aggregator uses the importance scores for the first news digest and the second news digest to determine the news stories for the final news digest, e.g., by determining a predetermined quantity of the highest maximum importance scores for the news stories.

The snapshot aggregator uses the maximum importance scores, or the average or median, because a news story may be included in multiple snapshots or news digests. The snapshot aggregator may use any appropriate method to determine the top news stories for a digest time period and to generate a news digest.

Additional Implementation Details

Figure 4:
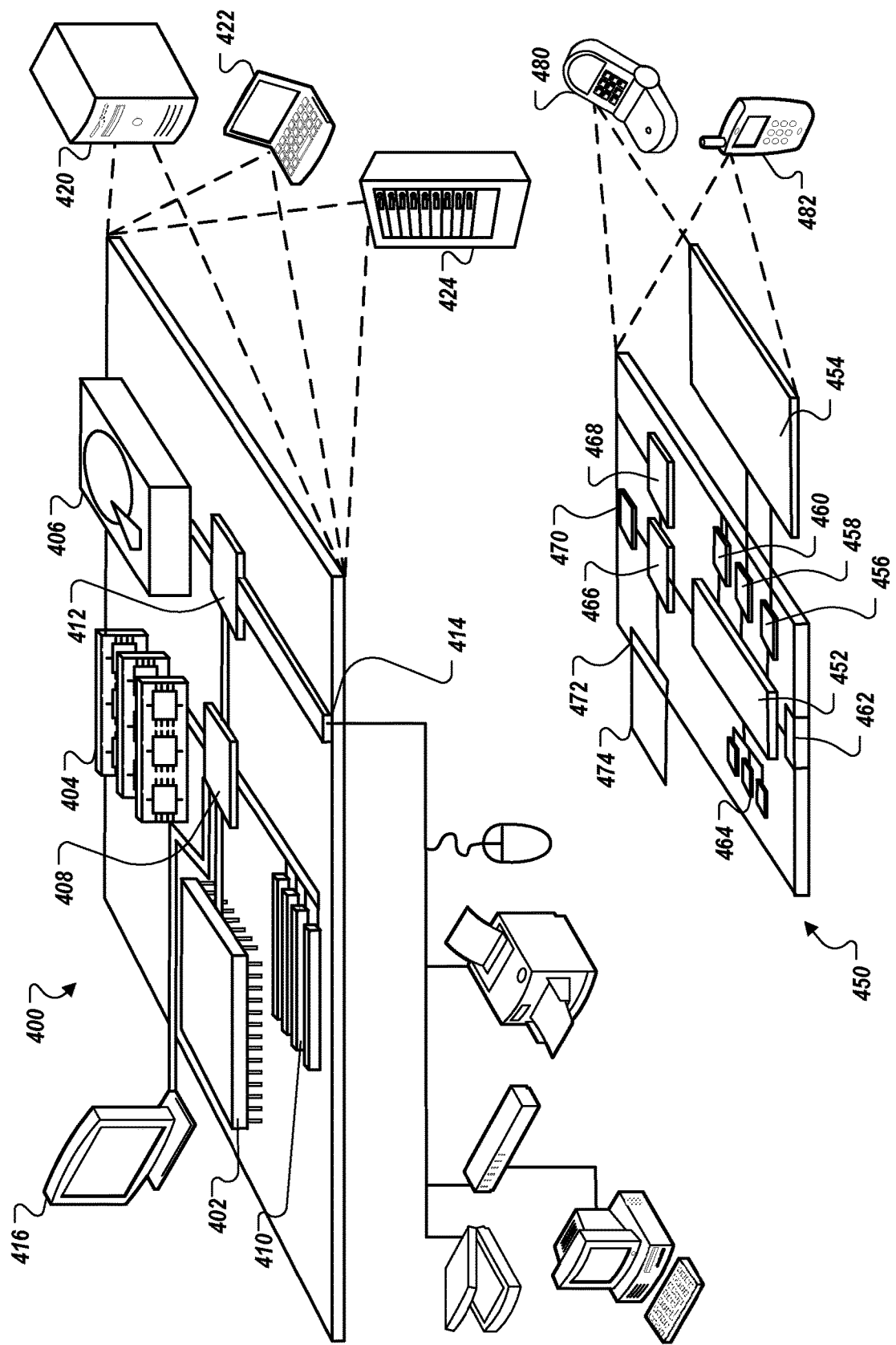
FIG. 4 is a block diagram of a computing system that can be used in connection with computer-implemented methods described in this document.

FIG. 4 is a block diagram of computing devices 400, 450 that may be used to implement the systems and methods described in this document, as either a client or as a server or plurality of servers. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, smartwatches, head-worn devices, and other similar computing devices. The components shown here, their connections and relationships, and their functions, are meant to be exemplary only, and are not meant to limit implementations described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a computer-readable medium. In one implementation, the memory 404 is a volatile memory unit or units. In another implementation, the memory 404 is a non-volatile memory unit or units.

The storage device 406 is capable of providing mass storage for the computing device 400. In one implementation, the storage device 406 is a computer-readable medium. In various different implementations, the storage device 406 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of duties is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can process instructions for execution within the computing device 450, including instructions stored in the memory 464. The processor may also include separate analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD display or an OLED display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provide in communication with processor 452, so as to enable near area communication of device 450 with other devices. External interface 462 may provide, for example, for wired communication (e.g., via a docking procedure) or for wireless communication (e.g., via Bluetooth or other such technologies).

The memory 464 stores information within the computing device 450. In one implementation, the memory 464 is a computer-readable medium. In one implementation, the memory 464 is a volatile memory unit or units. In another implementation, the memory 464 is a non-volatile memory unit or units. Expansion memory 474 may also be provided and connected to device 450 through expansion interface 472, which may include, for example, a SIMM card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS receiver module 470 may provide additional wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. For example, various forms of the flows shown above may be used, with steps re-ordered, added, or removed. Also, although several applications of the payment systems and methods have been described, it should be recognized that numerous other applications are contemplated. Accordingly, other embodiments are within the scope of the following claims.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer implemented method, comprising:

accessing a database storing news snapshots, each snapshot identifying a predetermined quantity of top news stories for a respective period of time, wherein the respective period of time for each snapshot is different from the respective period of time for each of the other snapshots, each of the top news stories in a particular snapshot for a particular period of time a) ranked according to an importance score that measures the importance of the news story relative to other news stories for the particular period of time and b) represented by one or more articles that describe the top news story, each of the periods of time having a predetermined length;

determining a digest time period that includes at least two or more of the periods of time, wherein the predetermined length for each of the two or more periods of time is shorter than a length for the digest time period;

determining, for the digest time period by accessing the database, two or more snapshots with periods of time included in the digest time period;

generating, from the top news stories in the determined two or more snapshots, a digest ranking of digest news stories for the digest time period using the importance scores for each of the top news stores included in the determined two or more snapshots, the generating comprising:

determining first top news stories included in the determined snapshots;

selecting, using the importance scores for the determined first top news stories, second top news stories for the digest time period from the determined first top news stories, the selecting comprising:

determining, for each of the determined first top news stories that is included in two or more of the determined snapshots, an importance score rate of change for the determined first top news story using the importance scores for the determined top news story from each of the determined snapshots; and selecting, as the second top news stories, the determined first top news stories that each have an importance score rate of change greater than each of the importance score rates of change for the other determined first top news stories not including the other second top news stories; and ranking the second top news stories using the importance scores for each of the second top news stories; and providing, to a user device, data identifying a plurality of the digest news stories, the plurality of the digest news stories including two or more top news story from at least two or more of the snapshots, to cause the user device to present the plurality of digest news stories according to the digest ranking, the data identifying the plurality of digest news stories including and identifying the respective period of time within the digest time period for which the digest news story is the top news story for the snapshot.

2. The system of claim 1, wherein determining the digest time period that includes at least two or more of the periods of time comprises receiving, from a user device, a request for a news digest for the digest time period.

3. The system of claim 1, wherein the data identifying the plurality of digest news stories including and identifying the respective period of time within the digest time period for which the digest news story is the top news story for the snapshot comprises data that is presented by a digital assistant.

4. A computer-implemented method comprising:
accessing a database storing news snapshots, each snapshot identifying a predetermined quantity of top news stories for a respective period of time, wherein the respective period of time for each snapshot is different from the respective period of time for each of the other snapshots, each of the top news stories in a particular snapshot for a particular period of time a) ranked according to an importance score that measures the importance of the news story relative to other news stories for the particular period of time and b) represented by one or more articles that describe the top news story, each of the periods of time having a predetermined length;
determining a digest time period that includes at least two or more of the periods of time, wherein the predetermined length for each of the two or more periods of time is shorter than a length for the digest time period;
determining, for the digest time period by accessing the database, two or more snapshots with periods of time included in the digest time period;
generating, from the top news stories in the determined two or more snapshots, a digest ranking of digest news stories for the digest time period using the importance scores for each of the top news stores included in the determined two or more snapshots, the generating comprising:
determining first top news stories included in the determined snapshots;
selecting, using the importance scores for the determined first top news stories, second top news stories for the digest time period from the determined first top news stories, the selecting comprising:
determining, for each of the determined first top news stories that is included in two or more of the determined snapshots, an importance score rate of change for the determined first top news story using the importance scores for the determined top news story from each of the determined snapshots; and
selecting, as the second top news stories, the determined first top news stories that each have an importance score rate of change greater than each of the importance score rates of change for the other determined first top news stories not including the other second top news stories; and
ranking the second top news stories using the importance scores for each of the second top news stories; and
providing, to a user device, data identifying a plurality of the digest news stories, the plurality of the digest news stories including two or more top news story from at least two or more of the snapshots, to cause the user device to present the plurality of digest news stories according to the digest ranking, the data identifying the plurality of digest news stories including and identifying the respective period of time within the digest time period for which the digest news story is the top news story for the snapshot.

5. The method of claim 4, wherein determining the digest time period that includes at least two or more of the periods of time comprises receiving, from a user device, a request for a news digest for the digest time period.

6. The method of claim 4, wherein the data identifying the plurality of digest news stories including and identifying the respective period of time within the digest time period for which the digest news story is the top news story for the snapshot comprises data that is presented by a digital assistant.

7. A non-transitory computer readable storage medium storing instructions executable by a data processing apparatus and upon such execution cause the data processing apparatus to perform operations comprising:
accessing a database storing news snapshots, each snapshot identifying a predetermined quantity of top news stories for a respective period of time, wherein the respective period of time for each snapshot is different from the respective period of time for each of the other snapshots, each of the top news stories in a particular snapshot for a particular period of time a) ranked according to an importance score that measures the importance of the news story relative to other news stories for the particular period of time and b) represented by one or more articles that describe the top news story, each of the periods of time having a predetermined length;
determining a digest time period that includes at least two or more of the periods of time, wherein the predetermined length for each of the two or more periods of time is shorter than a length for the digest time period;
determining, for the digest time period by accessing the database, two or more snapshots with periods of time included in the digest time period;
generating, from the top news stories in the determined two or more snapshots, a digest ranking of digest news stories for the digest time period using the importance scores for each of the top news stores included in the determined two or more snapshots, the generating comprising:
determining first top news stories included in the determined snapshots;
selecting, using the importance scores for the determined first top news stories, second top news stories for the digest time period from the determined first top news stories, the selecting comprising:
determining, for each of the determined first top news stories that is included in two or more of the determined snapshots, an importance score rate of change for the determined first top news story using the importance scores for the determined top news story from each of the determined snapshots; and
selecting, as the second top news stories, the determined first top news stories that each have an importance score rate of change greater than each of the importance score rates of change for the other determined first top news stories not including the other second top news stories; and
ranking the second top news stories using the importance scores for each of the second top news stories; and providing, to a user device, data identifying a plurality of the digest news stories, the plurality of the digest news stories including two or more top news story from at least two or more of the snapshots, to cause the user device to present the plurality of digest news stories according to the digest ranking, the data identifying the plurality of digest news stories including and identifying the respective period of time within the digest time period for which the digest news story is the top news story for the snapshot.

\* \* \* \* \*